US010700978B2

(12) United States Patent
Agarwal et al.

(10) Patent No.: US 10,700,978 B2
(45) Date of Patent: Jun. 30, 2020

(54) OFFLOADING AT A VIRTUAL SWITCH IN A LOAD-BALANCED GROUP

(71) Applicant: International Business Machines Corporation, Armonk, NY (US)

(72) Inventors: Kanak B. Agarwal, Austin, TX (US); Wenzhi Cui, Austin, TX (US); Wesley M. Felter, Austin, TX (US); Yu Gu, Cedar Park, TX (US); Eric J. Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

(21) Appl. No.: 15/368,800

(22) Filed: Dec. 5, 2016

(65) Prior Publication Data

US 2018/0159775 A1    Jun. 7, 2018

(51) Int. Cl.
*H04L 12/741* (2013.01)
*H04L 12/803* (2013.01)
*H04L 12/931* (2013.01)
*H04L 12/933* (2013.01)
*H04L 29/08* (2006.01)

(52) U.S. Cl.
CPC ............ *H04L 47/125* (2013.01); *H04L 49/15* (2013.01); *H04L 49/70* (2013.01); *H04L 67/1008* (2013.01); *H04L 67/322* (2013.01)

(58) Field of Classification Search
None
See application file for complete search history.

(56) References Cited

U.S. PATENT DOCUMENTS

| 5,031,089 | A  | 7/1991  | Liu et al.    |
|-----------|----|---------|---------------|
| 6,182,139 | B1 | 1/2001  | Brendel       |
| 8,863,096 | B1 | 10/2014 | Bucur et al.  |
| 2003/0046396 | A1 | 3/2003 | Richter et al. |
| 2003/0108027 | A1 | 6/2003 | Kim et al.    |
| 2004/0082294 | A1 | 4/2004 | Ekl et al.    |
| 2009/0268747 | A1 | 10/2009 | Kurata et al. |
| 2010/0146082 | A1 | 6/2010 | Isobe         |
| 2010/0274885 | A1 | 10/2010 | Yoo et al.    |

(Continued)

OTHER PUBLICATIONS

Singh et al; TCP-ADA: TP with adaptive delayed acknowledgement for mobile ad hoc networks, Wireless Communications and Networking Conference, Jul. 19, 2004, WCNC 2004 IEEE, http://ieeexplore.ieee.org/document/1311806/?tp=&arnumber=1311806&url=http:%2F%2Fieeexplore.ieee.org%2Fiel5%2F9178%2F29116%2F01311806.pdf%Farnumber%3D1311806.

(Continued)

*Primary Examiner* — Willie J Daniel, Jr.
(74) *Attorney, Agent, or Firm* — Garg Law Firm, PLLC; Rakesh Garg; Brian Welle

(57) ABSTRACT

A determination is made at an application executing in conjunction with a switch that a request packet sent to a virtualized computing entity (VCE) connected to the switch should be offloaded to a second VCE. A destination of the request packet is changed from the VCE to the second VCE, to form a first modified request packet. An evaluation is made whether a response packet from the second VCE, which is responsive to the request packet, is usable in the data communication with a sender of the request packet. When the evaluating is affirmative, the first modified request packet is caused to be transmitted from the switch to the second VCE.

20 Claims, 5 Drawing Sheets

(56) References Cited

U.S. PATENT DOCUMENTS

| | | | |
|---|---|---|---|
| 2011/0022812 | A1 | 1/2011 | Van der Linden et al. |
| 2011/0040876 | A1 | 2/2011 | Zhang et al. |
| 2011/0153828 | A1 | 6/2011 | Park et al. |
| 2011/0276699 | A1 | 11/2011 | Pedersen |
| 2012/0278493 | A1 | 11/2012 | Thornburgh et al. |
| 2014/0019602 | A1* | 1/2014 | Murthy ............... H04L 67/1027 709/223 |
| 2014/0047104 | A1 | 2/2014 | Rodriguez |
| 2014/0229610 | A1 | 8/2014 | Shen et al. |
| 2014/0310417 | A1 | 10/2014 | Sorenson, III et al. |
| 2015/0078152 | A1* | 3/2015 | Garg ................... H04L 41/0668 370/219 |
| 2015/0178359 | A1 | 6/2015 | Grasselt et al. |
| 2015/0332331 | A1 | 11/2015 | Sura |
| 2016/0162004 | A1 | 6/2016 | Ljubuncic et al. |
| 2016/0328273 | A1 | 11/2016 | Molka et al. |
| 2017/0005863 | A1 | 1/2017 | Falco |
| 2018/0018610 | A1 | 1/2018 | Del Balso et al. |
| 2018/0032580 | A1 | 2/2018 | Guz |

OTHER PUBLICATIONS

Chen et al; TCP with Delayed Ack for Wireless Networks, Broadband Communications, Networks and Systems, 2006. Broadnets 2006. 3rd International Conference on Oct. 1-5, 2006, Nov. 5, 2007, http://ieeexplore.ieee.org/document/4374405/?tp=&arnumber=4374405&url=http:%2F%2Fieeeexplore.ieee.org%2Fxpls%2Fabs_all.jsp%3Farnumber%3D4374405.

Altman et al; Novel Delayed ACK Techniques for Improving TCP Performance in Multihop Wireless Networks, PWC 2003, LNCS 2775, pp. 237-250, 2003. IFIP International Federation for Information Processing 2003.

Bai et al; PAC: Taming TCP Incast Congestion Using Proactive ACK Control, Network Protocols (ICNP), 2014 IEEE 22nd International Conference on Oct. 21-24, 2014, Dec. 11, 2014, http://ieeexplore.ieee.org/document/6980401/.

Liu et al; RepNet: Cutting Tail Latency in Data Center Networks with Flow Replication, Jan. 26, 2015.

Hsu et al. Adrenaline: Pinpointing and Reining in Tail Queries with Quick Voltage Boosting. [online] (Feb. 11). IEEE., pp. 271-282. Retrieved From the Internet <https:I/ieeexplore.ieee.org/abstract/document/7056039> (Year: 2015).

USPTO, Non Final Office Action, U.S. Appl. No. 15/368,763, dated Mar. 25, 2019.

USPTO, Final Office Action, U.S. Appl. No. 15/368,763, dated Jan. 23, 2020.

USPTO, Non Final Office Action, U.S. Appl. No. 15/368,776, dated Dec. 14, 2018.

USPTO, Non Final Office Action, U.S. Appl. No. 15/368,776, dated Oct. 18, 2019.

USPTO, Final Office Action, U.S. Appl. No. 15/368,776, dated Jun. 24, 2019.

USPTO, Advisory Action, U.S. Appl. No. 15/368,776, dated Sep. 12, 2019.

* cited by examiner

OFFLOADING AT A VIRTUAL SWITCH IN A LOAD-BALANCED GROUP

TECHNICAL FIELD

The present invention relates generally to a method, system, and computer program product for improving job execution performance in load-balanced groups of peer data processing systems. More particularly, the present invention relates to a method, system, and computer program product for offloading at a virtual switch in a load-balanced group.

BACKGROUND

In a load-balanced configuration, a load-balancer system receives requests for service from numerous client systems. Depending on the load-balancing algorithm used therein, the load-balancer sends a received request to one of the systems participating in the load-balanced group of systems serviced by the load-balancer. The system that receives the request from the load-balancer processes the request, or queues the request for processing, depending on the conditions and configuration of the system.

A system that is participating in the load-balanced group can be a virtual machine (VM). Any reference to a system is a reference to a VM unless expressly distinguished where used. A VM includes virtualized representations of real hardware, software, and firmware components available in a data processing system. The data processing system can have any number of VMs configured thereon, each VM utilizing any number of virtualized components therein. The data processing system is also referred to as a host, and the VM operating thereon to process a client request is also referred to as a computing node, a compute node, or simply a node.

A commonly used method of virtualization—traditional virtualization—preconfigures various VM configurations as template images (templates). When a VM having a specific predetermined configuration has to be created on a compute node, a suitable template is selected from a template storage, such as a database or a file-system, and installed on the compute node to create a VM having the desired configuration. An image of a VM in traditional virtualization is a monolithic binary image.

Another method for virtualization is container-based virtualization. Container-based virtualization, also called operating system virtualization, is an approach to virtualization in which the virtualization layer runs as an application within the operating system. In this approach, the operating system's kernel runs on the hardware node with several isolated application environments installed on top of it. The isolated guest application environments are called containers. In other words, a container is a running instance of an image of a VM in which the layers are distinguishable from one another.

Hereinafter, a virtualized computing entity (VCE) is a reference to a VM or a container, depending upon the implementation. The illustrative embodiments are described with respect to VMs only for the clarity of the description and not to imply any limitation thereto. The illustrative embodiments can be adapted for applying to a load-balanced group of containers, and such adaptations are contemplated within the scope of the illustrative embodiments.

A virtual switch or vSwitch is a virtual networking component that operates in a manner similar to a physical networking switch device. For example, a vSwitch determines a packet's destination and provides the destination address and port-based packet forwarding function to the interfaces utilizing the vSwitch. Unlike a physical switch, which is a hardware device, a vSwitch is an instantiation of a virtual object from the execution of software designed to operate in the manner of a physical switch.

As an example, one or more VMs executing on a host data processing system can be configured to interface with a vSwitch executing on the host. The vSwitch receives data packets from the interfacing VMs and sends the packets to the datacenter network with which the vSwitch also interfaces. Similarly, the vSwitch receives data packets from the datacenter network—e.g. from a load-balancer—and sends the packets to the appropriate interfacing VM destination.

Presently, if a system in a load-balanced group has excessive utilization of the processor, the memory, the network bandwidth, the electrical power, or some other computing resource, the system can offload the request to another peer system in the group. Such presently available offloading is dependent only upon the utilization-related conditions of one or more computing resources in system.

Some other presently available offloading algorithms look at the number of requests pending in a queue in the system. When that queue-size exceeds a threshold, the presently available offloading algorithm offloads one or more requests from the queue to shorten the queue. A request is interchangeably referred to herein as a "job" unless expressly distinguished where used.

SUMMARY

The illustrative embodiments provide a method, system, and computer program product. An embodiment includes a method that determines, at an application executing in conjunction with a switch, that a request packet sent to a VCE connected to the switch should be offloaded to a second VCE. The embodiment changes a destination of the request packet from the VCE to the second VCE, to form a first modified request packet. The embodiment evaluates whether a response packet from the second VCE, and responsive to the request packet, is usable in the data communication with a sender of the request packet. The embodiment causes, responsive to the evaluating being affirmative, the first modified request packet to be transmitted from the switch to the second VCE.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Some novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
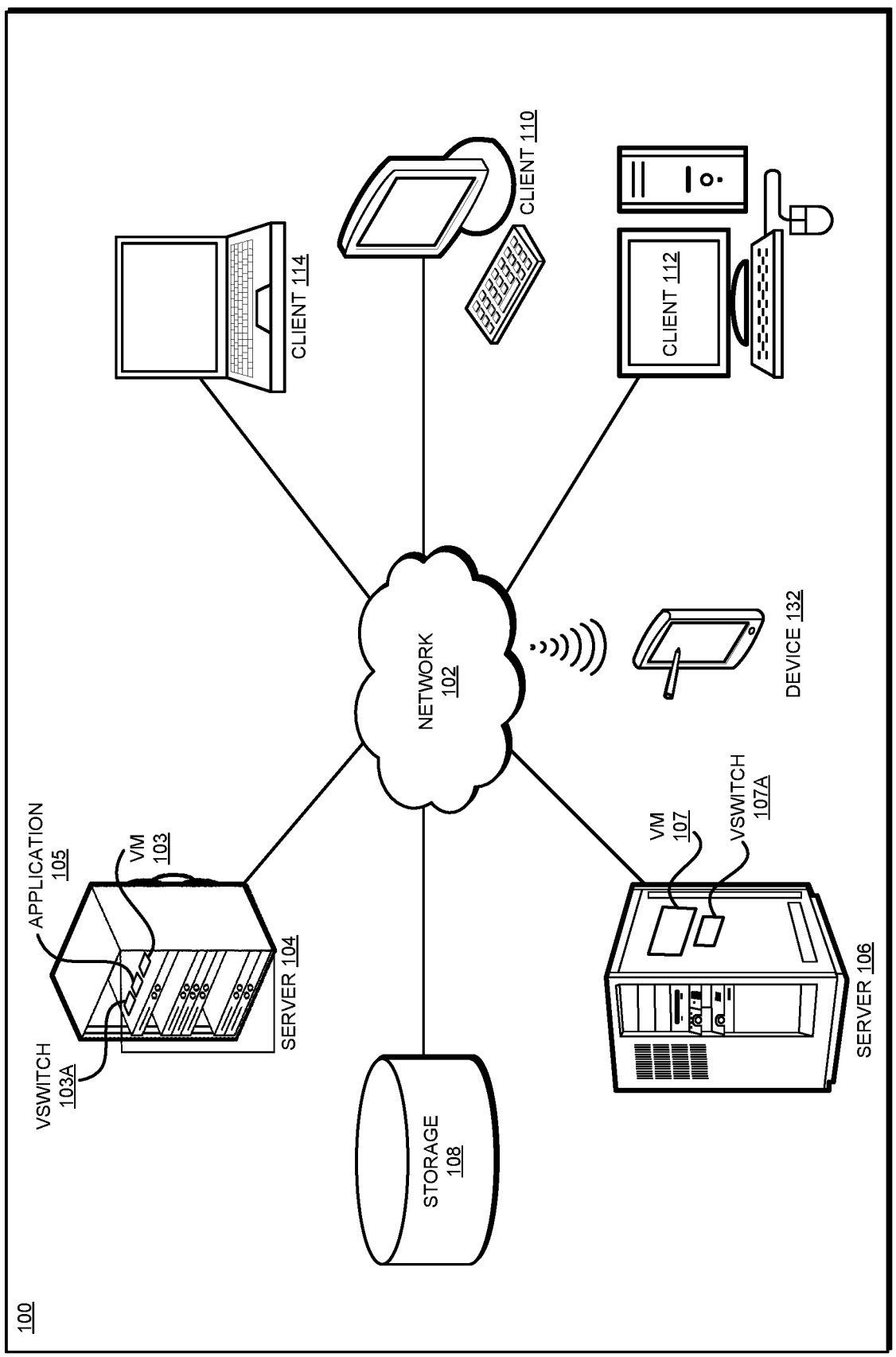
FIG. 1 depicts a block diagram of a network of data processing systems in which illustrative embodiments may be implemented.

The illustrative embodiments recognize that there are instances when a request may have to be offloaded from one system—a VM, to another system—another VM. The offloading may have to be performed for any number or types of reasons. For example, a resource of a VM may be over-utilized and the VM may have to offload a request to another VM to reduce the utilization. As another example, a VM may be planned for migration, shutdown or slowdown, e.g., due to maintenance activities, and the VM may have to offload at least some requests for the duration of the maintenance to maintain acceptable level of processing the remaining requests.

As another non-limiting example reason, a request may be expected to take an unusually high time to process under certain circumstances. An example of such an occurrence is when other requests of the same or similar type are processed normally within an expected processing duration, but one or more requests of the type take an unusually long time for processing, the system conditions remaining largely unchanged.

In other words, if the processing times of a set of requests of a particular type were plotted, a Bell curve would normally result. The peak of the Bell curve represents the median processing time for the set of requests of that type, and some portion of the curve on each side of the peak represents the expected range of processing times for a significant majority of the requests in the set.

The outliers are those requests that are represented by the far ends of the Bell curve. Some low-side outliers are represented by the end-portion of the curve that represents the shortest processing times. Other high-side outliers are those requests that are represented by the other end-portion of the curve where the processing times exceeded the processing times of the vast majority of the requests.

These high-side outliers are the requests of interest in this disclosure. The inordinately high processing times of a high-side outlier is called a "tail latency." Tail latency has been found to be unrelated to the utilization conditions prevailing in the system. In other words, regardless of the utilization of a computing resource being high or low in the system, a high-side outlier request can have a long tail latency for reasons that are not apparent or related to the utilization conditions.

A system condition is a utilization, scarcity, pre-commitment, or other such resource-related condition existing in a system. In some cases, but not necessarily, tail latency can be explained or controlled by the system conditions. But, in many cases, tail latencies can be caused independent of system conditions. Tail latency can occur when the utilization of a system is below a threshold utilization, a queue-size is below a threshold queue-size, or both. Generally, some idiosyncrasy with other applications executing on the system, the networking stack, the network, the hypervisor, or a hardware component of the system is related to the tail latency.

The illustrative embodiments recognize that some requests suffer tail latencies while processing. The illustrative embodiments further recognize that utilization-based offloading algorithms, or queue-length-based offloading algorithms will not be able to offload such requests particularly when the utilization and/or the queue length does not justify or trigger the offloading. Consequently, given the presently available offloading algorithms in load-balanced data processing environments, it is likely that a high-side outlier request may suffer a tail latency in a system and yet continue to be queued or processed at the system.

Continuing processing a request that is suffering a tail latency, or is likely to suffer a tail latency, is detrimental to system performance, is undesirable for the user experience, can breach a service level agreement, and can have other undesirable effects. For example, one online retailer has found that every 100 milliseconds of latency costs them one percent in sales. A search engine has found that for an extra 0.5 seconds in search page generation time, the traffic dropped by twenty percent. A broker could lose four million dollars in revenues per millisecond if their trading platform is five milliseconds behind the competition. Many of these delays can be from tail latencies.

The illustrative embodiments recognize that for tail latencies and many other reasons, offloading from one VM to another VM in a load-balanced group may be advantageous. The illustrative embodiments further recognize that computing the request assignment at the load-balancer can be slow in software-based load balancers and expensive in hardware-based load balancers. Instrumenting a VM specifically to perform the offloading functions takes computing resources away from the tasks for which the VMs have been primarily configured. VMs may also not have access to hypervisor resource utilization or other information pertaining to the server on which the VM runs in order to perform this type of functions. Therefore, the illustrative embodiments recognize that the offloading functions, particularly as relate to VM participants of a load-balanced group, should be performed elsewhere.

The illustrative embodiments recognize that the presently available tools or solutions do not address these needs or provide adequate solutions for these needs. The illustrative embodiments used to describe the invention generally address and solve the above-described problems and other problems related to offloading at a virtual switch in a load-balanced group.

An embodiment can be implemented as a software application. The application implementing an embodiment can be configured as a modification of an existing physical or virtual switch, as a separate application that operates in conjunction with an existing physical or virtual switch, a standalone application, or some combination thereof.

Furthermore, an embodiment operates to provide offloading functionality to a VM; and in doing so operates separately and independently of any prior-art utilization-based or queue-length-based offloading algorithm that may also be operational for the VM.

An embodiment, which is executing in conjunction with a vSwitch that its being used by a VM (S1), makes a determination that a request that has been received for S1 should be offloaded from S1 to another VM in the load-balanced group. The embodiment selects the other VM (S2)—to which the request should be offloaded—by any suitable method. As some non-limiting examples, a redundant VM, an underutilized VM, an over-provisioned VM, or a VM with a below-threshold queue-length may be selected as S2. The two VMs could be on the same host data processing system, but could also be on different data processing systems.

Once the embodiment has determined that an offloading operation has to occur from S1, and has selected a suitable S2 to which to offload, the embodiment determines a manner in which the offloading should be performed.

For example, under certain circumstances, a request may be from a client system that does not care which server processes the request. In other words, the client or the request has no affinity to any particular VM in the load-balanced group. In such cases, even though the load-balancer sent the request to VM S1, VM S2 can send the response to the client.

Under such circumstances, an embodiment modifies a destination information in the request packet to indicate VM S2 as the destination of the request. An information of a source or a destination within the scope of the illustrative embodiments comprises addressing information usable to send and receive request and response packets. As a non-limiting example, in TCP/IP communications, a source information is a network address and port information from where the packet originated in a network link. An original source information is the source information of an original or first sender of the packet. Similarly, in TCP/IP communications, a destination information is a network address and port information where the packet is sent in a network link.

The embodiment then sends, or causes the vSwitch to send, the modified request packet to S2. The source information remains unchanged in the offloaded request packet, i.e., the original sender of the request—the client—remains the source of the request. Accordingly, VM S2 processes the request packet and sends the corresponding response packet to the client. In other words, the destination of the response is the original source of the request according to the unchanged source information in the request packet.

The embodiment can cause the destination information to change in a variety of ways. A packet header includes the destination information as sent by the load-balancer. One embodiment changes the destination information from to S2 in the existing packet header. Another embodiment adds a new header to the packet received from the load-balancer and inserts the new destination information of S2 in the new header.

In addition, under certain circumstances, additional actions may be needed to ensure that the response from S2 can reach the client. For example, a firewall in the network between S2 and the client may not be expecting a response packet from S2 for the client. Under normal operations, the firewall may drop the response packet, which would be undesirable in the offloading scenario.

Accordingly, under this and other similar circumstances, an embodiment constructs an instruction for a network component. The network component can be a hardware, software, or firmware component, which participates in ensuring that the response packet reach the client. The instruction configures the network component such that the network component expects the response packet from S2 for the client. The configuration occurs prior to the transmission of the response packet from S2.

When the network component configured according to the instruction detects the response packet being transmitted from, or on behalf of S2, to the client, the configured network component allows the response packet to be delivered to the client, or otherwise does not obstruct such a transmission.

As another example, under certain other circumstances, a request may be from a client system that does care which server processes the request. In other words, the client or the request has some affinity to a particular VM in the load-balanced group. In such cases, if the request is sent to VM S1, then VM S1 should respond to the client regardless of the fact that VM S1 decides to offload the request to VM S2. In other words, even if S2 processes the request, the response should come back to S1, and S1 should then send that response to the client.

To enable this manner of accomplishing the offloading function, an embodiment sets the destination of the request packet to S2 in any of the manners described herein. Setting the information of S2 as the destination in the request packet causes S2 to receive the request from the vSwitch of S1.

The embodiment further maintains a record of source information mappings at the vSwitch of S1. The embodiment makes an entry corresponding to the request packet in the mapping record. The entry includes an identifier of the request packet, information of the original source of the request packet—e.g., the address and port information of the original source of the packet, and the source information of S1—e.g. the address and port information of S1 when S1 is acting as a sender of the packet.

The embodiment modifies the original source information of the request packet such that, to S2, the packet appears to have come from S1 instead of the client. As with the modification of the destination information, the embodiment can accomplish modification of the source information in a variety of ways.

A packet header in the request packet, as sent by the load-balancer, includes the original source information. One embodiment changes the original source information from the client to S1 in the existing packet header. Another embodiment adds a new header to the packet that is received from the load-balancer, and inserts the new source information of S1 in the new header.

The modified request packet according to the illustrative embodiments causes VM S2 to perform the following operations in the following manner—When VM S2 receives the modified request packet, VM S2 processes the request in the packet and prepares a response packet. VM S2 sends the response packet to the sender of the modified request packet, i.e., to VM S1. In the response packet, VM S2 includes the identifier of the modified request packet—which is unchanged from the identifier of the request packet received at S1. The request identifier indicates the correspondence between the response packet and the modified request packet.

Upon receiving a response packet from VM S2, an embodiment looks-up the mapping record to locate the entry corresponding to the request identifier in the response packet. The embodiment modifies the source information of the response packet with the source information of S1 such that the response packet appears to have come from S1 and not S2. The embodiment modifies the destination information of the response packet to the original source information, i.e., the information of the client, such that the response packet can be transmitted to the client from S1 or on behalf of S1.

The manner of offloading at a virtual switch in a load-balanced group described herein is unavailable in the presently available methods. A method of an embodiment described herein, when implemented to execute on a device or data processing system, comprises substantial advancement of the functionality of a VM executing in that device or data processing system in efficiently offloading jobs to other VMs in a load-balanced group whether or not the utilization or the queue size of the VM justifies offloading.

The illustrative embodiments are described with respect to certain types of requests, VMs, system conditions, algorithms, peer systems, load-balancing, thresholds, tolerances, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
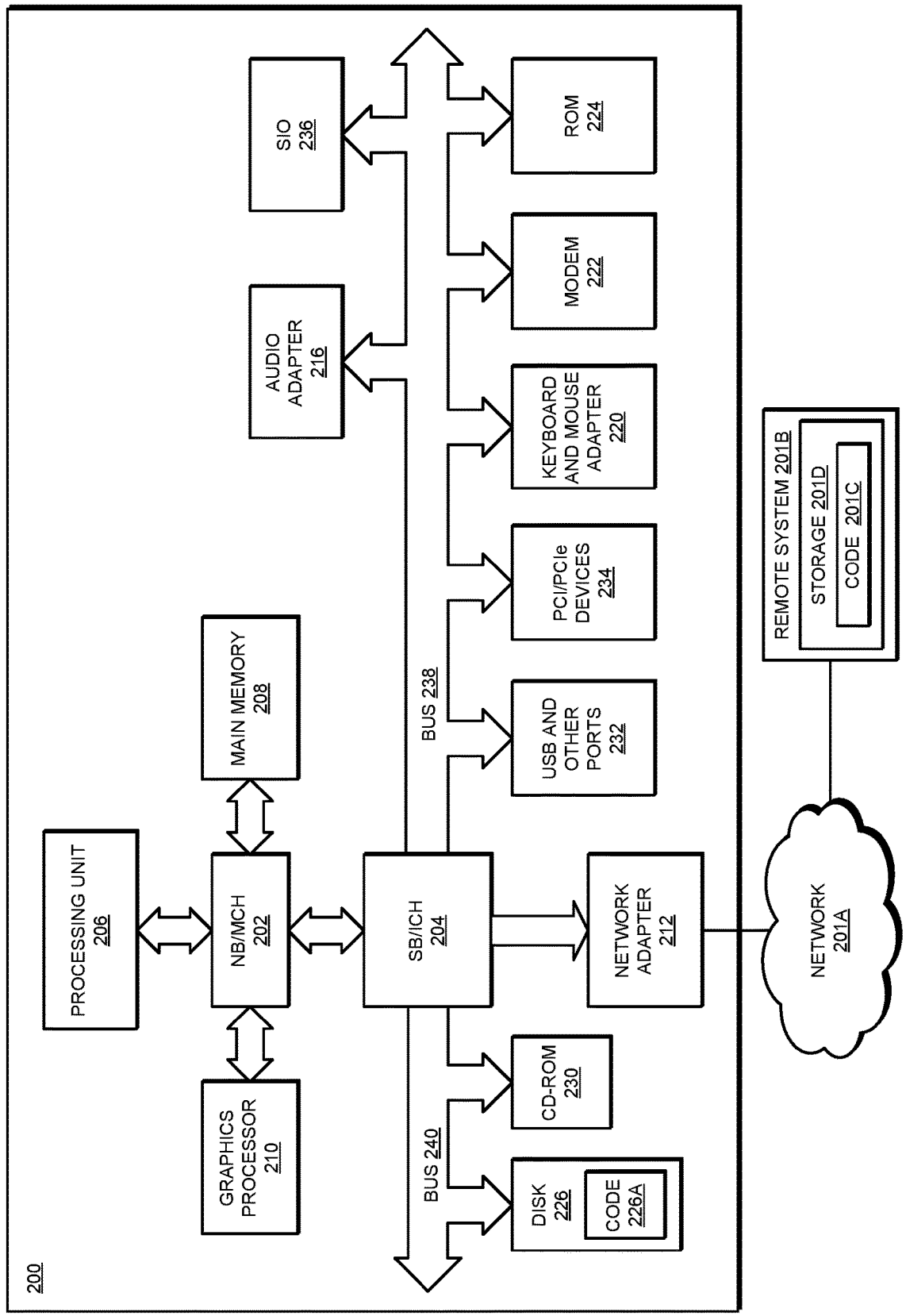
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

VM 103 is a participant system in load-balanced group. vSwitch 103A is a virtual switch used by VM 103. Application 105 implements an embodiment described herein and operates in conjunction with vSwitch 103A. Similarly, VM 107 is another participant system in load-balanced group. As shown, VM 107 uses vSwitch 107A on host server 106. Another instance (not shown) of application 105 may operate in conjunction with vSwitch 107A. VM 107 can also be configured (not shown) on host server 104, and to use (not shown) vSwitch 103A.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
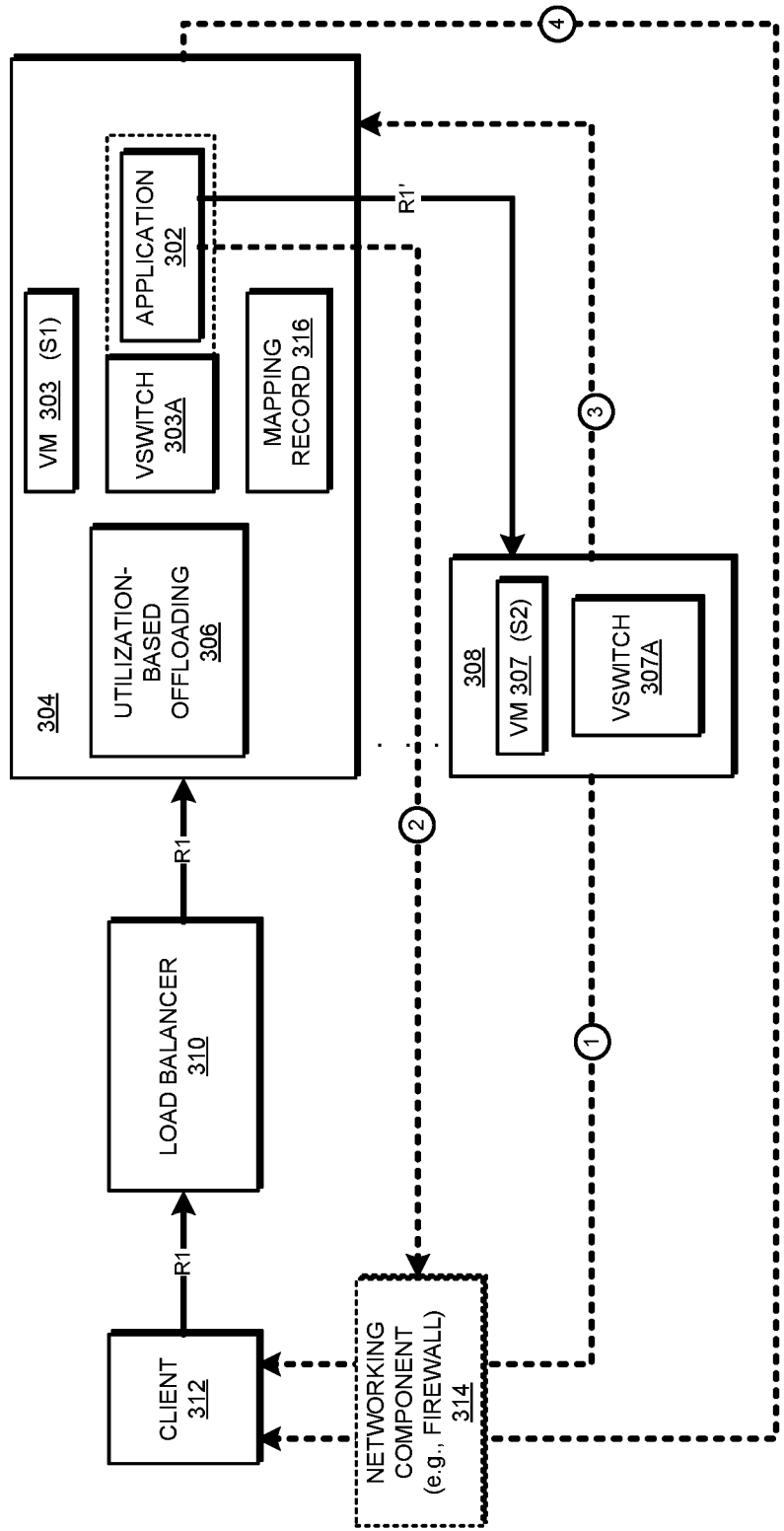
FIG. 3 depicts a block diagram of an example configuration for offloading at a virtual switch in a load-balanced group in accordance with an illustrative embodiment.

With reference to FIG. 3, this figure depicts a block diagram of an example configuration for offloading at a virtual switch in a load-balanced group in accordance with an illustrative embodiment. Application 302 is an example of application 105 in FIG. 1.

Application 302 provides the offloading features to VM 303, which is operating on host data processing system 304. Application 302 operates in conjunction with vSwitch 303A and provides offloading features to VM 303 for tail latency reasons and other reasons, as described herein. Application 302 may operate and provide this functionality without depending upon or interfering with prior-art utilization-based or queue size-based offloading algorithm 306, that may be operating in system 304.

Systems 304 and 308 host VMs 303 and 307, respectively, and VMs 303 and 307 are participants in a load-balanced group managed by load-balancer 310. Only as a non-limiting example configuration, VM 303 is depicted as using vSwitch 303A for its operations, and VM 307 is depicted as using vSwitch 307A for its operations.

In operation, suppose that load-balancer 310 receives request R1 from a client data processing system 312. Load-balancer 310 sends R1 to VM 303, via vSwitch 303A, for processing. Application 302 determines by a method described herein that R1 should be offloaded. Accordingly, application 302 selects VM 307 for offloading R1. As a part of the offloading, application 302 sends, or causes vSwitch 303A to send modified R1 (R1') to VM 307 for processing at system 306. Note that algorithm 306 may not find a utilization-based justification or a queue-size based justification for offloading R1 to system 308 at the time application 302 decides to offload R1 to VM 307 due to tail latency or other reasons.

Application 302 can construct R1' in two different manners, as described herein. According to one method of constructing R1', application 302 changes the destination information in request R1—either by overwriting existing destination information of VM 303 with the destination information of VM 307 in an existing header of R1, or by adding a new header to R1 with the destination information of VM 307.

When R1' is formed by changing only the destination information of R1, VM 307 processes R1' and transmits a response packet to client 312 on path 1 (labeled with circled 1 in the figure). Path 1 delivers the response packet from VM 307 to client 312. through network component 314, e.g., a firewall.

Path 1 may pass through or be controlled by network component 314, e.g., a firewall. Optionally, before VM 307 delivers the response packet via path 1 through or under the control of network component 314, application 302 sends an instruction to network component 314 via path 2(labeled with circled 2 in the figure). The instruction causes network component 314 to allow or enable the transmission of the response packet on path 1.

According to another method of constructing R1', application 302 changes the destination information in request R1 as described earlier. Application 302 also additionally changes the source information—either by overwriting existing original source information of client 312 with the source information of VM 303 in an existing header of R1, or by adding a new header to R1 with the source information of VM 303. Application 302 also makes an entry into mapping record 316 as described herein.

When R1' is formed by changing the source and the destination information, VM 307 processes R1' and transmits a response packet to VM 303 on path 3 (labeled with circled 3 in the figure). VM 303 uses the entry made earlier in mapping record 316 to change a source information and a destination information in the response packet. Particularly, in the response packet received at VM 303 from VM 307, VM 303 changes the source information of VM 307 to the source information of VM 303, and the destination information of VM 303 to the destination information of client 312. VM 303 then delivers the modified response packet via path 4 to client 312. Path 4 may deliver the response packet from VM 303 to client 312, but because that response corresponds with the request from client 312 to VM 303, no configuration changes are needed in networking component 314.

Figure 4:
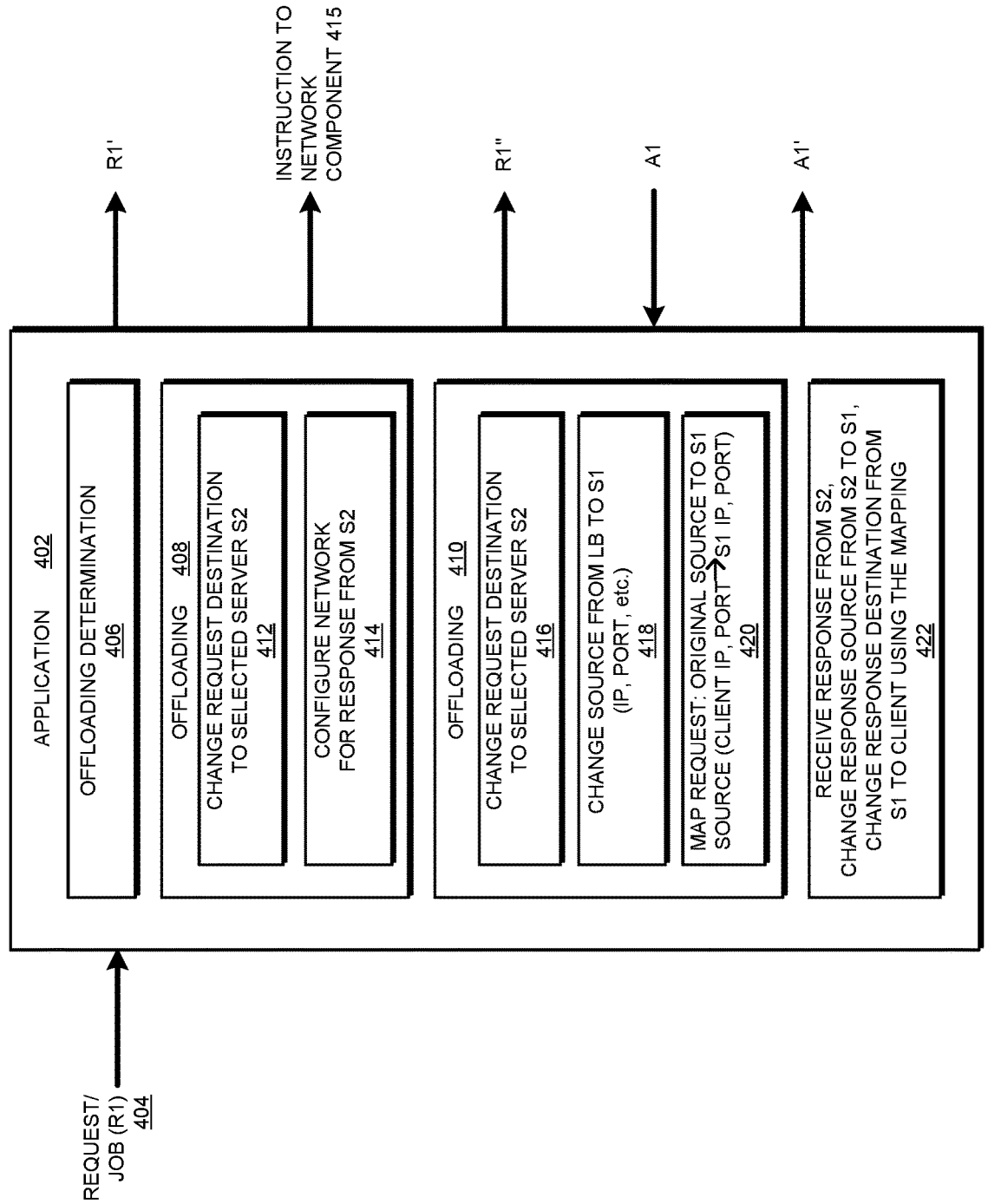
FIG. 4 depicts a block diagram of an application for offloading at a virtual switch in a load-balanced group in accordance with an illustrative embodiment.

With reference to FIG. 4, this figure depicts a block diagram of an application for offloading at a virtual switch in a load-balanced group in accordance with an illustrative embodiment. Application 402 can be implemented as application 302 in FIG. 3.

Request 404 (R1) is an example of request R1 in FIG. 3, which is sent to a vSwitch operating in conjunction with application 402. Request 404 is sent in this manner for processing to a VM (S1). Component 406 detects request 404 and determines whether request 404 should be offloaded to another VM, e.g., to VM 307 (S2) in FIG. 3. When request 404 has to be offloaded, component 406 selects a suitable offloading VM (S2). The offloading function to VM S2 is performed using offloading component 408 or offloading component 410. Which of components 408 and 410 is used for the offloading depends on a variety of factors, including a type of request 404, a tail latency prediction for request 404, an ability of VM S1 to process request 404 as needed, or some combination of these and other factors.

Offloading component 408 is used for the offloading function when VM S2 can directly respond to a sender of request 404, e.g., to load-balancer 310 or client 312 in FIG. 3. Offloading component 410 is used for the offloading function when VM S1 must send the response back to the sender of request 404, e.g., to load-balancer 310 or client 312 in FIG. 3.

When component 408 is used, subcomponent 412 changes a destination of request 404 to S2. The changing of the destination forms a modified request R1'. Application 402 causes the vSwitch to send R1' to S2. When a network component, such as component 314 in FIG. 3, has to be configured to allow S2 to send response A1 to the sender of request 404, subcomponent 414 constructs instruction 415 and sends to such component. Instruction 415 causes the network component to be configured to allow response A1 to flow from S2 to the sender of request 404.

When component 410 is used for the offloading function, subcomponent 416 changes the destination of request 404 from S1 to S2. Subcomponent 418 changes the source of request 404 from client 312 (or load-balancer 310) to S1. The changes result in modified request R1". Application 402 causes the vSwitch to send modified request R1" to S2.

Subcomponent 420 makes a record entry in a mapping record, e.g., in mapping record 316 in FIG. 3. The entry includes an identifier of request 404, a source information of the sender of request 404 (e.g., of load-balancer 310 or client 312 in FIG. 3), and source information of S1.

When S2 returns response A1, subcomponent 422 receives response A1 and changes the response source from S2 to S1. Subcomponent 422 also uses the mapping entry created by subcomponent 420 to change the destination from S1 to the sender of request 404. These changes result in modified response 1'. Application 402 causes the vSwitch to send modified response A1' to the sender of request 404.

Figure 5:
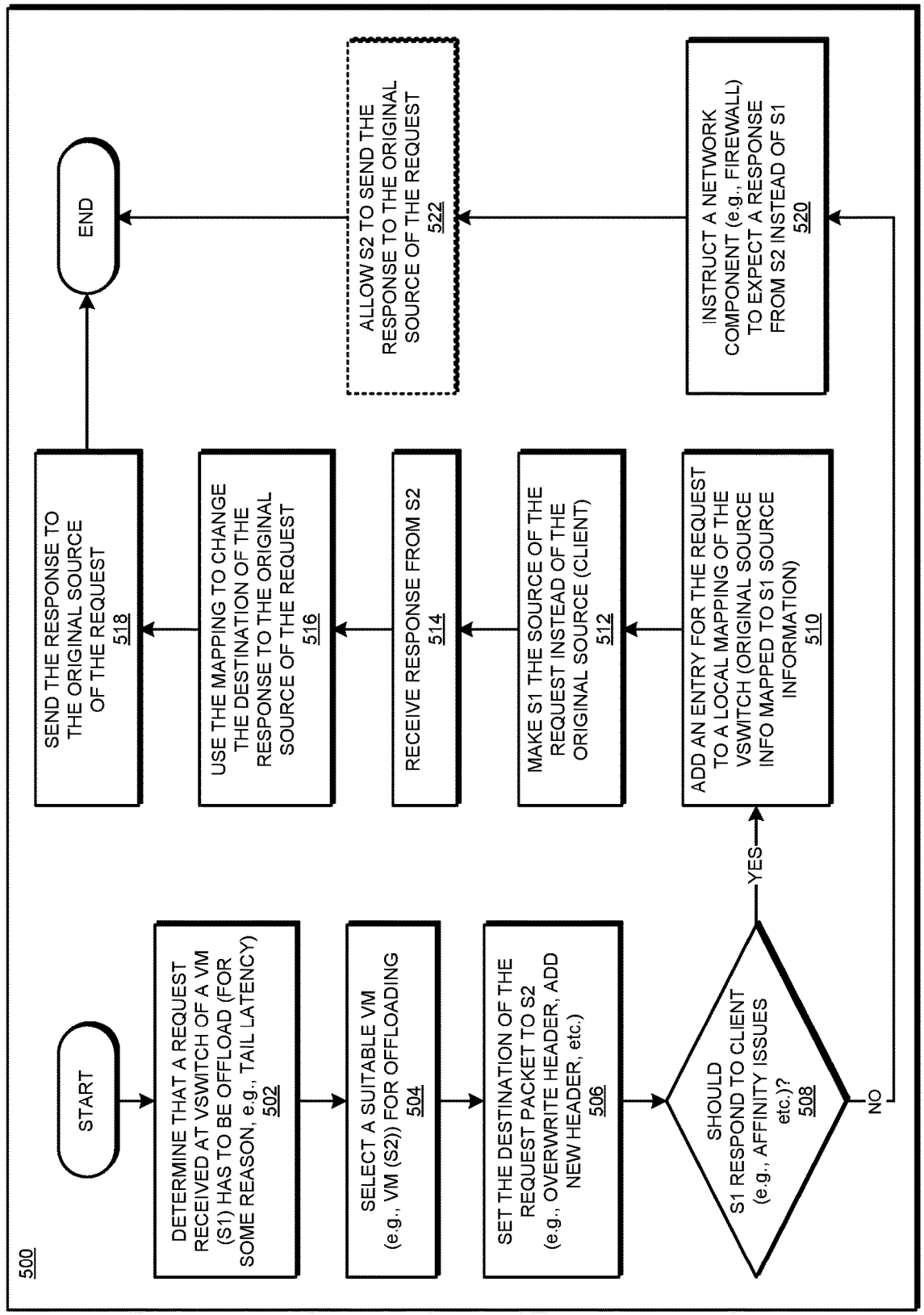
FIG. 5 a flowchart of an example process for offloading at a virtual switch in a load-balanced group in accordance with an illustrative embodiment depicts.

With reference to FIG. 5, this figure depicts a flowchart of an example process for offloading at a virtual switch in a load-balanced group in accordance with an illustrative embodiment. Process 500 can be implemented using application 402 in FIG. 4.

Application 402 determines that a request received at a vSwitch for a VM (S1) has to be offloaded (block 502). The application selects a suitable VM (S2) for the offloading (block 504). The application sets the destination of the request packet to S2 (block 506).

The application determines whether the response to the sender of the request should come from S1, e.g., due to an affinity issue (block 508). If the response should be from S1 ("Yes" path of block 508), the application adds in a mapping record an entry corresponding to the request, as described herein (block 510). The application further modifies the request such that S2 regards S1 as the source of the request in a manner described herein (block 512).

The application receives a response (A1) from S2 (block 514). The application uses the entry in the mapping record to change the destination of the response from S1 to the sender of the request of block 502 (block 516). The application sends the modified response to the request sender (block 518). The application ends process 500 thereafter.

If the response need not be from S1 ("No" path go block 508), the application may optionally instruct a network component to expect a response to the request from S2 instead of from S1 (block 520). The instruction causes the network component to allow the response from S2 to reach the sender of the request of block 502 (block 522). The application ends process 500 thereafter.

Thus, a computer implemented method, system or apparatus, and computer program product are provided in the illustrative embodiments for tail latency-based job offloading in load-balanced groups and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining, at an application executing in conjunction with a switch, that a request packet sent to a virtualized computing entity (VCE) connected to the switch should be offloaded to a second VCE;
   changing a destination of the request packet from the VCE to the second VCE, to form a first modified request packet;
   evaluating whether a response packet from the second VCE, and responsive to the request packet, is usable in the data communication with a sender of the request packet, evaluating comprising:
   determining a source of the response packet,
   wherein the source of the response packet is modified to where the response packet is transmitted from another source;
   determining a configuration of a network component, the network component controlling the data communication the sender of the request packet,
   wherein the network component determines whether to control the response packet or allow the response packet to pass through; and
   causing, responsive to the evaluating being affirmative, the first modified request packet to be transmitted from the switch to the second VCE.

2. The method of claim 1, further comprising:
   constructing, at the application, an instruction for the network component and
   sending the instruction to the network component, wherein the instruction configures the network component to allow the response packet from the second VCE to pass to the sender of the request packet.

3. The method of claim 2, wherein the instruction configures the network component prior to the second VCE sending the response packet to the second of the packet.

4. The method of claim 1, further comprising:
   adding, responsive to the evaluating being negative, an entry in a mapping record of the switch, the entry comprising (i) an identifier of the request packet, (ii) a network information of the sender of the request, and (iii) a network information of the VCE;
   further modifying the first modified request packet by changing a source of the request packet from the sender of the request packet to the VCE, to form a second modified request packet; and
   causing, responsive to the evaluating being negative, the second modified request packet to be transmitted from the switch to the second VCE.

5. The method of claim 4, further comprising:
   receiving, at the switch, for the VCE, the response packet from the second VCE;
   changing, using the entry, a destination of the response packet from the VCE to the second of the request packet, forming a modified response jacket; and causing the switch to transmit the modified response packet on behalf of the VCE to the sender of the request packet.

6. The method of claim 1, wherein the second VCE is connected to a different switch.

7. The method of claim 1, wherein the sender of the request packet is a load-balancer, wherein the VCE and the second VCE are participants in a load-balanced group of the load-balancer.

8. The method of claim 1, wherein the sender of the request packet is a client system, wherein the client sends the request packet, a load-balancer receives the request packet, and the load-balancer sends the request packet to the VCE via the switch.

9. The method of claim 1, further comprising:
overwriting, as a part of changing the destination, an existing destination information in an existing header of the request packet.

10. The method of claim 9, wherein the existing destination information comprises a network address and a port of the VCE, and wherein the existing destination information is overwritten with new destination information, the new destination information comprising a second network address and a second port of the second VCE.

11. The method of claim 1, further comprising:
adding, as a part of changing the destination, a new header to the request packet; and populating a new destination information in the new header of the request packet, the new destination information comprising a second network address and a second port of the second VCE.

12. The method of claim 1, further comprising:
receiving the request packet from a load-balancer, wherein the VCE and the second VCE are participant systems in a load-balanced group managed by the load balancer.

13. The method of claim 12, further comprising:
selecting the second VCE from a set of VCEs, wherein the set of VCEs are participants in the load-balanced group.

14. The method of claim 1, wherein the switch is a virtual switch (vSwitch), and wherein the application is part of the vSwitch.

15. The method of claim 1, further comprising:
computing that a processing of the request packet will experience tail latency, wherein determining that the request packet should be offloaded to the second VCE is responsive to the tail latency.

16. The method of claim 1, wherein the VCE is a virtual machine (VM).

17. A computer usable program product comprising one or more computer-readable storage devices, and program instructions stored on at least one of the one or more storage devices, the stored program instructions comprising:
program instructions to determine, at an application executing in conjunction with a switch, that a request packet sent to a virtualized computing entity (VCE) connected to the switch should be offloaded to a second VCE;
program instructions to change a destination of the request packet from the VCE to the second VCE, to form a first modified request packet;
program instructions to evaluate whether a response packet from the second VCE, and responsive to the request packet, is usable in the data communication with a sender of the request packet, the program instructions to evaluate comprising:
program instructions to determine a source of information of the response packet,
wherein the source of the response packet is modified to where the response packet is transmitted from another source;
program instructions to determine a configuration of a network component, the network component controlling the data communication with the sender of the request packet, wherein the network component determines whether to control the response packet or allow the response packet to pass through; and
program instructions to cause, responsive to the evaluating being affirmative, the first modified request packet to be transmitted from the switch to the second VCE.

18. The computer usable program product of claim 17, wherein the computer usable code is stored in a computer readable storage device in a data processing system, and wherein the computer usable code is transferred over a network from a remote data processing system.

19. The computer usable program product of claim 17, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to determine, at an application executing in conjunction with a switch, that a request packet sent to a virtualized computing entity (VCE) connected to the switch should be offloaded to a second VCE;
program instructions to change a destination of the request packet from the VCE to the second VCE, to form a first modified request packet;
program instructions to evaluate whether a response packet from the second VCE, and responsive to the request packet, is usable in the data communication with a sender of the request packet, the program instructions to evaluate comprising:
program instructions to determine a source information of the response packet,
wherein the source of the response packet is modified to where the response packet is transmitted from another source;
program instructions to determine a configuration of a network component, the network component controlling the data communication with the sender of the request packet, wherein the network component determines whether to control the response packet or allow the response packet to pass through; and
program instructions to cause, responsive to evaluating being affirmative, the first modified request packet to be transmitted from the switch to the second VCE.

* * * * *